(12) United States Patent
Balakrishnan et al.

(10) Patent No.: US 8,365,152 B2
(45) Date of Patent: Jan. 29, 2013

(54) PATH-SENSITIVE ANALYSIS THROUGH INFEASIBLE-PATH DETECTION AND SYNTACTIC LANGUAGE REFINEMENT

(75) Inventors: Gogul Balakrishnan, Plainsboro, NJ (US); Sriram Sankaranarayanan, Plainsboro, NJ (US); Franjo Ivancic, Princeton, NJ (US); Aarti Gupta, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1175 days.

(21) Appl. No.: 12/183,416

(22) Filed: Jul. 31, 2008

(65) Prior Publication Data

US 2009/0193401 A1 Jul. 30, 2009

Related U.S. Application Data

(60) Provisional application No. 61/023,161, filed on Jan. 24, 2008.

(51) Int. Cl.
*G06F 9/45* (2006.01)

(52) U.S. Cl. ........................................ 717/138; 717/152

(58) Field of Classification Search .................. 717/134, 717/135, 138, 152
See application file for complete search history.

(56) References Cited

U.S. PATENT DOCUMENTS

2008/0301655 A1* 12/2008 Gulwani et al. ............... 717/156

OTHER PUBLICATIONS

Zhang, J. and Wang, X., A Constraint Solver and Its Application to Path Feasibility Analysis, Int'l Journal of Software Engineering & Knowledge Engineering, vol. 11, No. 2, pp. 139-156 (2001).*

Gulwani, S. and Necula, G., Path-Sensitive Analysis for Linear Arithmetic and Uninterpreted Functions, University of California—Berkeley (2004).*

Gulavani, B. and Rajamani, S., Counterexample Driven Refinement for Abstract Interpretation, 2006, http://www.cse.iitb.ac.in/~bhargav/ publications/tacas06.pdf [last accessed Apr. 26, 2012], 15 pages.*

Leino, K.R.M. and Logozzo, F., Loop invariants on demand, CiteSeerx, 2005, 16 pages.*

Bodik et al.; Refining Data Flow Information Using Infeasible Paths; DSE/ESEC; Zurich, Switzerland; Sep. 1997; pp. 361-377.

Durjati et al.; Path Sensitive Dataflow Analysis with Iterative Refinement; SAS 2006; pp. 425-442.

L. Mauborgne et al.,; Trace Partitioning in Abstract Interpretation; European Symposium on Programming; (ESOP); 2005; 16 pages.

Das et al.; ESP: Path-Sensitive Program Verification in Polynomial Time; PLDI '02; Jun. 17-19, 2002; Berlin, Germany; 12 pages.

Bodik et al.; Interprocedural Conditional Branch Elimination; PLDI; 1997; Las Vegas, NV; pp. 146-158.

Ngo et al.; Detecting Large Number of Infeasible Paths through Recognizing Their Patterns; FSE 2007; pp. 215-224.

Sandaranarayanan et al.; Static Analysis in Disjunctive Numerical Domains; SAS 2006; LNCS 4134; 2006; 15 pages.

* cited by examiner

*Primary Examiner* — Anna Deng

(74) *Attorney, Agent, or Firm* — James Bitetto; Joseph Kolodka (57) ABSTRACT

A system and method for infeasible path detection includes performing a static analysis on a program to prove a property of the program. If the property is not proved, infeasible paths in the program are determined by performing a path-insensitive abstract interpretation. Information about such infeasible paths is used to achieve the effects of path-sensitivity in path-insensitive program analysis.

12 Claims, 3 Drawing Sheets

```
0: if (x > 0)
1:     f := 1;
2: else
3:     f := 0;
4: y := x;
5: if (f > 0)
6:     ASSERT(y >= 0);
```

FIG. 1

```
 1: proc VerifyProperty((n, φ))
 2:     I := N
 3:     while ( I ≠ ∅ ) do
 4:         Let η_F be the forward fixpoint computed starting from (n_0, φ_0)
 5:         Let η_B be the backward fixpoint computed starting from (n, ¬φ)
 6:         I := ∅
 7:         for all conditional branches ℓ → m ∈ E do
 8:             if ( η_F(m) ⊓ η_B(m) ≡ false) then
 9:                 Let I := I ∪ {n ∈ N | n is control dependent on ℓ → m}.
10:             end if
11:         end for
12:         Remove the nodes in I from the CFG
13:         if η_F(n) ≡ false then
14:             return PROVED.
15:         end if
16:     end while
17:     return NOT PROVED.
18: end proc
```

```
1: if (x < 0)
2:   x := 1;
3:   y := 1;
4: else
5:   x := 2;
6:   y := 3;
7: if(y = 2)
8:   x := x - 2;
9: ASSERT(x >= 0);
```

FIG. 5

```
1: proc GenericSATEnumerateCore(φ₁,...,φₘ)
2:    Let y₁...,yₘ be boolean variables.
3:    I := true.
4:    Add constraints for conflict-pairs and their supersets to I.
5:    while (I is satisfiable ) do
6:       (y₁,...,yₘ) := satisfying assignment to I,
7:       Let ψ ≡ ⋀_{yᵢ:true} φᵢ.
8:       if ψ is theory satisfiable  then
9:          I := I ∧ ⋁_{yᵢ:false} yᵢ.
10:      else
11:         Let J be the unsat core for ψ.
12:         Output J as an infeasible set.
13:         I := I ∧ ⋁_{j∈J} ¬yⱼ.
14:      end if
15:   end while
16: end proc
```

FIG. 6

PATH-SENSITIVE ANALYSIS THROUGH INFEASIBLE-PATH DETECTION AND SYNTACTIC LANGUAGE REFINEMENT

RELATED APPLICATION INFORMATION

This application claims priority to provisional application Ser. No. 61/023,161 filed on Jan. 24, 2008 incorporated herein by reference.

BACKGROUND

1. Technical Field

The present invention relates to computer verification and more particularly to systems and methods for analyzing programs statically using abstract interpretation for a path-sensitive analysis using a path-insensitive analysis.

2. Description of the Related Art

There have been three significant categories that incorporate path sensitivity into program analysis: (a) performing a path-sensitive analysis, selectively merging or separating the contributions from different program points in the analysis; (b) performing a disjunctive completion of the abstract domain to track disjunctive invariants directly. However, the process is expensive and not entirely practical; (c) performing repeated abstraction refinements, either by changing the iteration scheme used to effectively unroll loops further or using a fixpoint-guided abstraction-refinement scheme).

Static analysis techniques compute sound over-approximations of the set of reachable states of a given program. Such an over-approximation is computed as a fixpoint in a suitably chosen abstract domain using abstract interpretation. Abstract interpretation controls the precision of the analysis through a judicious choice of an abstract domain.

The static analyzer may report false positives due to the over-approximations. The precision lost due to the over-approximations may be recovered in part through techniques such as path sensitive analysis, disjunctive completion and domain refinement, as described above. Path-sensitive analyses reason about different sets of program paths in isolation, thus minimizing the impact of the join operation at the merge points in the program. However, a completely path-sensitive analysis is forbiddingly expensive in practice. Therefore, many static-analysis algorithms aim for intermediate solutions that selectively join or separate the contributions due to different paths to achieve a degree of path sensitivity that is adequate to prove properties at hand. Such approaches rely on heuristics to determine whether to merge contributions from different paths in the analysis, or alternatively, keep them as separate disjuncts.

Recent work on abstract interpretation has been focused on refining the initial abstract domain or the iteration itself to obtain incrementally more precise results. In practice, we found that many syntactic paths in a control flow graph (CFG) representation of the program are semantically infeasible, i.e., they may not be traversed by any execution of the program. Reasoning about the infeasibility of such paths is a key factor in performing accurate static analyses for checking properties such as correct application program interface (API) usage, absence of null-pointer dereferences and uninitialized use of variables, memory leaks, and so on.

SUMMARY

Previous experience of the inventors with building path-sensitive abstract interpreters indicates that the benefit of added path sensitivity to static analysis seems to lie mostly in the identification and elimination of semantically infeasible paths. Path-insensitive analyses are mostly unable to reason about such infeasible paths unless the analysis is carried out over a complex abstract domain. Moreover, even though the property of interest may be syntactic (e.g., checking API call sequences), its resolution usually hinges on the ability to reason about the numeric and symbolic data elements in the program, which requires a semantically richer domain. A goal of the present embodiments is to provide a new approach to obtain the benefits of path-sensitive reasoning in programs using a path-insensitive analysis as the underlying primitive. We present an abstract interpretation scheme to characterize and enumerate sets of semantically infeasible paths in programs. The present techniques perform a sequence of many forward and backward runs using a path-insensitive abstract interpreter to detect infeasible paths. It then uses an enumeration technique using combinations of propositional SAT solvers and theory satisfiability checkers to avoid repeating previously enumerated paths. Then, we combine infeasible path detection to successively refine the set of syntactic paths in the control flow graph (CFG). Doing so, an underlying path-insensitive analysis can be used to infer proofs that would have otherwise required a path-sensitive analysis.

The present approach: (a) uses abstract interpretation in a systematic manner to handle loops, conditions, procedures, and so on without sacrificing soundness, (b) employs an underlying analysis approach to detect infeasible paths, which is path-insensitive, which makes it possible to apply the approach on a whole-program basis without requiring much overhead or depth cutoffs. The present approach has been implemented in an analyzer tool which is able to prove more properties with a reasonable overhead.

A system and method for infeasible path detection includes performing a static analysis on a program to prove a property of the program. It the property is not proved, infeasible paths in the program are determined by performing a path-insensitive abstract interpretation. Information about such infeasible paths is used to achieve the effects of path-sensitivity in path-insensitive program analysis.

A system for infeasible path detection includes an abstract interpretation engine configured to perform a static analysis on a program to prove a property of the program, the engine configured to perform a path-insensitive abstract interpretation by a sequence of path-insensitive forward and backward propagations using an abstract domain to determine assertions corresponding to reachable program states at program points. A satisfiability solver and theory satisfiability checker are employed in combination to generate subsets of the assertions whose conjunction is logically false to determine infeasible paths in the program.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles detect semantically infeasible paths in programs using abstract interpretation. Described herein are techniques for detecting infeasibility, and the techniques are instantiated for commonly used abstract domains, such as intervals and octagons. The present techniques use a sequence of path-insensitive forward and backward runs of an abstract interpreter using a suitable abstract domain to infer paths that cannot be exercised in concrete executions of the program.

We then present a syntactic language refinement (SLR) technique that excludes semantically infeasible paths inferred by the present technique in subsequent runs of an abstract interpreter to iteratively improve the results of the analysis. Specifically, we are able to incrementally obtain the effects of a path-sensitive analysis by using syntactic language refinement in an underlying path-insensitive static analyzer. Experimental results were obtained to quantify the impact of the present technique on an abstract interpreter for C programs.

A systematic method is hereby provided to detect and enumerate infeasible-path segments using abstract interpretation. Previous approaches have been ad-hoc, the handling of loops is incomplete, assumptions are made about the nature/structure of programs, and they can only handle specific patterns of infeasibility. The enumerated infeasible-path segments solutions are employed to obtain the effects of a path-sensitive analysis. This is based on the insight that path-sensitive analysis gains precision mostly by ruling out infeasible paths. The present approach is therefore more direct.

Embodiments described herein may be entirely hardware, entirely software or including both hardware and software elements. In a preferred embodiment, the present invention is implemented in software, which includes but is not limited to firmware, resident software, microcode, etc.

The present principles include detecting infeasible-path using path-insensitive analysis, and using the paths detected to obtain better results akin to path-sensitive analysis. Different techniques are provided that use path-insensitive abstract interpretation to detect infeasible paths in the program. Such paths are guaranteed not to be traversed by any execution of the program. Using the results of an infeasibility detector, we perform syntactic language-refinement to remove these infeasible paths from the program. The resulting program can still be represented using a control flow graph (CFG) representation. A path-insensitive analysis on this program lets us rule out more infeasible paths, and thus, permit further refinement of the program structure. In the end, the refinement is fine enough to permit us to prove properties that would have otherwise required path-sensitive reasoning. All the while, the methods use a path-insensitive analysis as its underlying static analysis.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
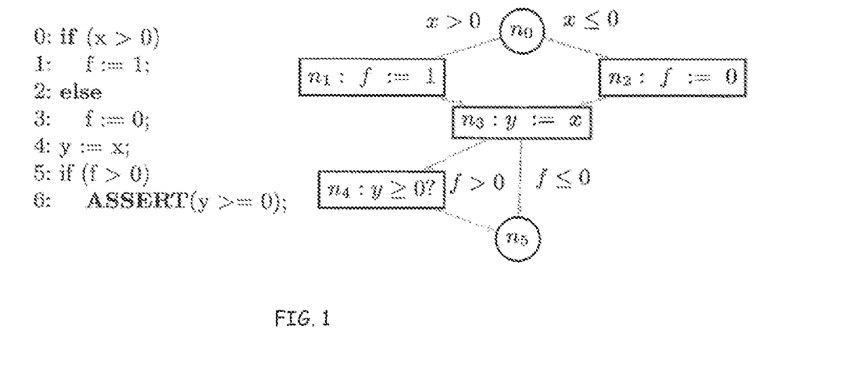
FIG. 1 is a diagram showing program code and a control flow diagram for demonstrating principles in accordance with illustrative embodiments.

Referring now to the drawings in which like numerals represent the same or similar elements and initially to FIG. 1, an example program is shown that depicts a commonly occurring situation in static analysis. On the left of FIG. 1 is program code and on the right of FIG. 1 a corresponding control flow graph (CFG) corresponding to the program. A sign of the variable is evaluated at the beginning and a result placed in a flag variable f. Later, a condition based on f guards an assertion indirectly involving n. A path-insensitive static analysis using the polyhedral abstract domain is unable to prove the property since it loses the correlation between f and x by computing a join at node $n_3$. On the other hand, the techniques that are presented herein permit the proof of using path insensitive analysis that any semantically feasible path from node $n_0$ to node $n_4$ cannot pass through node $n_2$. Syntactic language refinement removes this path from the CFG, and performs a new path-insensitive analysis on the remaining paths in the CFG. Such an analysis maintains the correlation between x and f at node $n_3$ and successfully proves the property.

Figure 2:
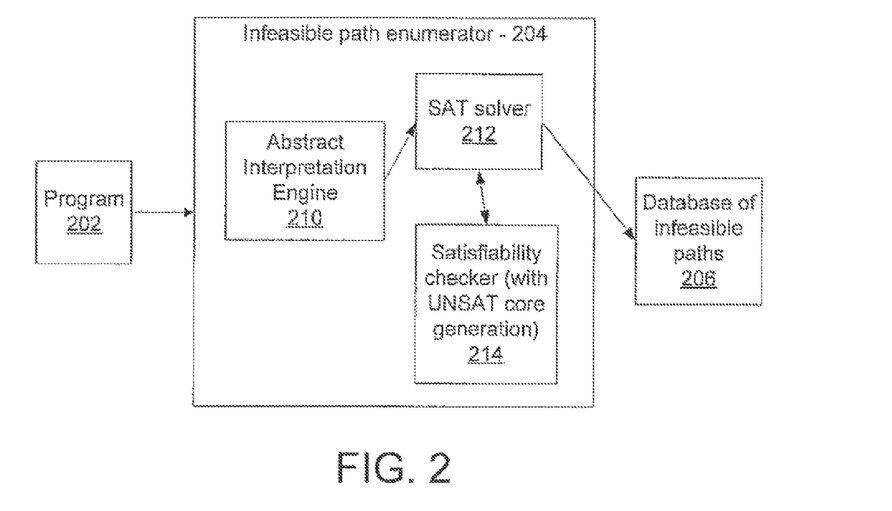
FIG. 2 is a block/flow diagram showing a system/method for determining infeasible paths in a program in accordance with the present principles.

Referring to FIG. 2, a system/method for determining infeasible paths using abstract interpretation is illustratively shown. A program 202 to be analyzed is input to an infeasible path enumerator 204. Enumerator 204 analyzes the program 202 to determine infeasible paths, and outputs the infeasible paths to a database 206. The enumerator 204 preferably includes an abstract interpretation engine 210. Engine 210 is used to identify an over-approximation of the reachable states at each point in the program 202 using abstract interpretation or equivalent methods. This engine 210 is run a plurality of times, starting from each program location, analyzing the program 202 in a fixed direction chosen by the user. The approach works for forward abstract interpretation from the current program point to the end of the program or for backward abstract interpretation from the current location to the initial node. As a result, we obtain an assertion $P_i$ corresponding to each program point i.

A satisfiability (SAT) 212 solver is employed to enumerate paths in the program that are infeasible based on the results of abstract interpretation from engine 210. The SAT solver 212 works with a satisfiability checker 214 to check the program code to determine if program paths and conditions can be satisfied.

Given assertions $P_1, P_2, \ldots, P_n$ corresponding to program locations $1, 2, \ldots, n$, respectively, we use a combination of SAT solver 212 and a theory satisfiability checker 214 with UNSAT core generation to generate all subsets of $P_1, \ldots, P_n$ whose conjunction is logically false. One observation is that the program points 1 ... n corresponding to each such conjunction give rise to an infeasible path. Such infeasible paths are recorded in the database 206.

The enumerator 204 systematically detects and enumerates infeasible-path segments using abstract interpretation. This provides, e.g., complete handling of loops, and is performed without the necessity of making assumptions about the nature/structure of the program.

The scheme described above may be executed using a given abstract interpretation engine (off-the-shelf) to construct an infeasible-path enumerator.

Figure 3:
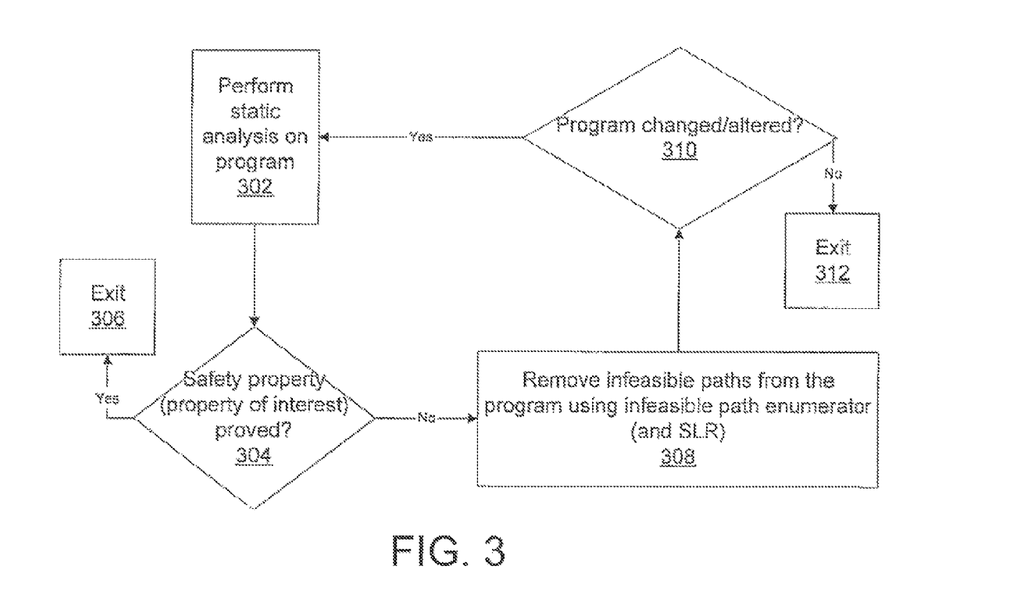
FIG. 3 is a block/flow diagram showing a system/method for determining whether a particular property holds and to verify the same using infeasible paths determined in FIG. 2 in accordance with the present principles.

Referring to FIG. 3, a system/method for employing path-insensitive analysis to simulate path sensitive analysis is illustrative show. Using the database 206 of infeasible paths in FIG. 2 the effects of a path-sensitive analysis is obtained. This is based on the insight that path-sensitive analysis gains precision by ruling out infeasible paths. This approach is therefore more direct.

The detected paths (infeasible) are employed to perform path-sensitive analysis, and may be employed in software testing, predicate abstraction, API usage analysis, etc. FIG. 3 uses the infeasible paths obtained earlier to perform better program analysis to find more property proofs and indirectly (through the use of a SAT 212 solver) find more bugs in the program 202. This is referred to as syntactic-language refinement (SLR) and works as follows. In block 302, analyze the current program (202). In block 304, if the analysis in block 302 has proved the property of interest (e.g., safety property proved), then exit in block 306. Otherwise, in block 308, run the infeasible-path enumeration described in FIG. 2 over the current program to determine infeasible paths, and remove these infeasible paths from the program's CFG description. This includes using SLR to refine the results. If the program has been altered as determined in block 310, the program path returns to block 302. Otherwise, the program path terminates in block 312.

In this process, we iterate through blocks 302, 304, 308 and 310, each time removing more and more program paths that are found to be semantically infeasible. This results in a sound analysis and has been shown to simulate the effect of a costlier path-sensitive analysis.

Program models, abstract interpretation, abstract domains, and some commonly used numerical domains will now be described for completeness. Throughout this disclosure, single-procedure (while) programs over integer variables will be employed as examples. However, the present results extend to programs with many procedures and more complex data types.

A program is represented by its control-flow graph (CFG), denoted $\langle M,E,\mu,n_0,\phi_0 \rangle$, where X is a set of nodes, $E \subset N \times N$ is a set of edges between the nodes, and $n_0 \in N$ is an initial location. Each edge $e \in E$ is labeled by a condition or an update $\mu(e)$. The assertion $\phi_0$ specifies a condition on the program variables that hold at the start of the execution.

A state of the program includes an integer valuation to each of the program variables. Let $\Sigma$ be the universe of all such valuations. A program is assumed to start from the initial location with a state satisfying $\phi_0$. The semantics of an edge $e \in E$ can be described by the (concrete) post-condition $$\overrightarrow{post}(e, S)$$

or the (concrete) weakest pre-condition (backward post-condition)

$$\overleftarrow{pre}(e, S)$$

for sets $s \in \Sigma$. The post(e,S) operator yields the smallest set of states reachable upon executing an edge from a given set of states S, while the pre(e,S) operator yields the smallest set T such that $$\overrightarrow{post}\left(e, \sum -1\right) \cap S = 0.$$

The pre-condition also corresponds to the post-condition of the reverse transition relation for the edge e.

Forward Propagation. The map $\eta: N \mapsto 2^\Sigma$ associates a set of states with each node in the CFG. For convenience, we lift set inclusion to maps as: $\eta_1 \subseteq \eta_2$. The map $\eta$ is an inductive (post fixpoint) map iff $$(\forall \, l \to m \in E), \; \overrightarrow{post}(l \to m, \eta(l)) \subseteq \eta(m)$$

The set of reachable states reach(•) is also the least inductive map. Any inductive map is also a post fixpoint of the forward-propagation operator $\eta' = \Im(\eta)$ over maps:

$$\eta'(m) = \begin{cases} \bigcup_{l \to m \in E} \overrightarrow{post}(l \to m, \eta(l)) & \text{if } m \neq n_0 \\ [\![\varphi_0]\!] & m = n_0 \end{cases}$$

In particular, the least inductive map is also the least fixpoint of the operator S in the concrete lattice $2^\Sigma$. Given a CFG, a property consists of a pair $\langle \eta, \phi \rangle$ where $n \in N$ is a node, and $\phi$ is a first-order assertion representing a set of states. Property $\langle \eta, \phi \rangle$ is verified if $\eta(n) \subseteq [\![\phi]\!]$ for an inductive map $\eta$.

A least inductive map can be computed using Tarski iteration. Starting from the initial map $\eta^0$ which maps $n_0$ to $\phi_0$ and all other nodes in the CFG to 0, we apply the operator $\eta^{l-1} = \Im(\eta^l)$ until a fixpoint is reached. Unfortunately, this process may be computationally infeasible if the program is infinite state. For such programs, the number of iterations needed to converge may be infinite. Secondly, at each iteration, the sets $\eta^l(n)$ for each node n may be infinite, and hence, not easy to manipulate. Therefore, the iteration on the concrete domain is not practically feasible.

To overcome the problem, abstract interpretation is used to compute an over-approximation of the fixpoint. During abstract interpretation, the set of states is represented by an element in an abstract domain. An abstract domain consists of a lattice $(L, \sqsubseteq, \sqcup, \sqcap)$ along with the abstraction map $\alpha: 2^\Sigma \mapsto L$ and the concretization map $\gamma: L \mapsto 2^\Sigma$. Each abstract object $\alpha \in L$ is associated with a set of states $\gamma(\alpha) \subseteq \Sigma$. The maps $\alpha$ and $\gamma$ together provide a Galois Connection between the concrete lattice $2^\Sigma$ and the abstract lattice L. The abstract counterparts for the union ($\cup$) and intersection ($\cap$) are the lattice join ($\sqcup$) and lattice meet ($\sqcap$) operators, respectively. Finally, the concrete post- and pre-conditions have the abstract counterparts $$\overrightarrow{post}_L \text{ and } \overleftarrow{pre}_L$$

in the abstract lattice L. An abstract domain map $\eta^\#: N \mapsto L$ associates each node $n \in N$ to an abstract object $\eta^\#(n) \in L$. The lattice ordering $\sqsubseteq$ can be naturally lifted to $\Lambda$ as follows: $\eta_1^\# \sqsubseteq$ iff $\forall \, n \in, \eta_1^\#(n) \sqsubseteq \eta_2^\#(n)$.

Corresponding to the forward propagation operator $\Im$ in the concrete domain, we may define an analogous abstract forward-propagation operator if $n^{\#\prime}=\Im^L(\eta^\#)$ in lattice L as follows:

$$\eta^{\#\prime}(m) = \begin{cases} \bigcup_{\varepsilon \to m \in E} \overrightarrow{post}_L (e, \eta^\#(l)) & \text{if } m \neq n_0 \\ \alpha([\![\varphi_0]\!]) & m = n_0 \end{cases}$$

For a given program, abstract interpretation starts with the initial map $\eta_0^\#$, where $\eta_0^\#(n_0)=\alpha([\![\phi_0]\!])$ and $\eta_0^\#(m)=\bot$ for all $m \neq n_0$. Each successive map is obtained by applying $\eta_{i+1}^\# = \Im^L(\eta_i^\#)$. It follows that $\eta_0^\# \subseteq \eta_1^\# \subseteq$. The process converges to a fixpoint $\eta_*^\#$ in L if $\eta_{i-1}^\# \subseteq \eta_i^\#$. Furthermore, its concretization $\gamma \circ \eta_*^\#$ is inductive (post fixpoint) on the concrete lattice. In practice, heuristics such as widening/narrowing can be used to enforce convergence of the iteration in the abstract lattice.

Backward Propagation. An alternative to verifying a given property $\langle \eta, \phi \rangle$ in a program is backward propagation using the $$\overleftarrow{pre}$$

operator. We compute the least fixpoint using the backward propagation operator $\phi' = B(\phi)$:

$$\phi'(l) = \begin{cases} [\![\neg \varphi]\!] & \text{if } l = n \\ \bigcup_{\varepsilon \to m \in E} \overleftarrow{pre}(l \to m, \phi(m)) & \text{otherwise} \end{cases}$$

starting with the initial map $\phi^0$ such that $\phi^0(n)=[\![\neg \phi]\!]$ and $\phi^0(m)=0$ for all $m \neq n$. A map $\phi$ is a post fixpoint of the operator B, if $B(\phi) \subseteq \phi$. Let $\phi$ be a post fixpoint of B. It follows that, for any location $\ell$, if there exists an execution starting from $\ell$ that violates the property $\langle n, \phi \rangle$ then such an execution must start from a state satisfying $\phi(\ell)$. As a direct result, the property can be established if $\phi(n_o) \cap \theta_o = 0$.

Analogous to forward propagation, it is possible to compute a backward (post)fixpoint map $\phi^\#$ in an abstract domain $(L, \subseteq, \sqcup, \sqcap)$ by defining an abstract backward-propagation operator $B^L$ using the pre-condition map $$\overleftarrow{pre}_L$$

interpreted in the abstract domain. The backward fixpoint also induces an inductive map that can be used to verify a property $\langle n, \phi \rangle$.

Infeasible-Path Detection: We now characterize infeasible paths in the program using path-insensitive abstract interpretation. Rather than focus on individual paths (of which there may be infinitely many), our results characterize sets of infeasible paths, succinctly. We assume a given abstract domain $(L, \subseteq, \sqcup, \sqcap)$ (or even a combination of many abstract domains) on which we obtain a forward projection operator $\Im^L$ and backward projection operator $B^L$. Given initial maps $\eta^0(\phi^0)$ with varying conditions, these operators yield (post) fixpoints in the lattice L, and in turn (post) fixpoints in the concrete domain by composition with the concretization map $\gamma$.

Consider a node $n \in N$ along with a set of states $[\![\phi]\!]$. We now define the forward and backward projection of the pair $\langle n, \phi \rangle$ onto a node $n' \in N$. Given a pair $\langle n, \phi \rangle$, we compute the forward fixpoint $\eta_F$ and the backward fixpoint $\eta_B$ starting from the following initial map:

$$\eta_0^{\langle n, \vartheta \rangle}(l) = \begin{cases} \alpha([\![\varphi]\!]), l = n \\ \bot, \text{otherwise} \end{cases}$$

The fixpoints $\eta_F$ and $\eta_B$ permit us to project the state set $[\![\phi]\!]$ forwards and backwards from n onto n':

Definition 1 (State-set Projection). The forward projection of the pair $\langle n, \phi \rangle$, onto a node n', denoted $$\left( \langle n, \varphi \rangle \xrightarrow{L} n' \right)$$

is the set $\gamma \circ \eta_F(n')$, where $\eta_F$ is a (post) fixpoint of $\Im^L$ starting from the initial map $\eta_0^{n,l}$.

Similarly, the backward projection of the pair $\langle n, \phi \rangle$ back onto n', denoted $$\left( n' \xleftarrow{L} \langle n, \varphi \rangle \right)$$

is the set $\gamma \circ \eta_B(n')$, where $\eta_B$ is the (post) fixpoint of $B^L$ starting from the initial map $\eta_0^{n,\theta}$. Note that the projection of a node n onto itself is the assertion true. The following lemma follows from the soundness of abstract interpretation:

Lemma 1. Let $$\varphi_F : \langle n, \varphi \rangle \xrightarrow{L} n' \text{ and } \varphi_B : n' \xleftarrow{L} \langle n, \varphi \rangle$$

denote the forward and backward projections, respectively of the pair $\langle \eta, \vartheta \rangle$ onto it n'. The following hold for state-set projections: 1) If an execution starting from a state $s \in [\![\phi]\!]$ at node n reaches node n' with state s', then $s' \in [\![\phi_F]\!]$. 2) If an execution starting from node n' with state s' reaches node n with state $s \in [\![\phi]\!]$ then $s' \in [\![\phi_B]\!]$.

Infeasibility Theorems: The state-set projections computed using forward and backward propagation can be used to detect semantically infeasible paths in a CFG. Let $n_1, \ldots, n_k$ be nodes in the CFG, $n_0$ be the initial node and $n_{k+1}$ be some target node of interest. We wish to find if an execution may reach $n_{k+1}$ starting from $n_0$, while passing through each of the nodes $n_1, \ldots, n_k$ possibly more than once and in an arbitrary order. Let $\Pi(n_0, \ldots, n_{k+1})$ denote the set of all such syntactically valid paths in the CFG.

Let $$\varphi_i : \langle n_i, \text{true} \rangle \xrightarrow{L} n_{k+1}, i \in [0, k+1],$$

denote the forward state-set projections from $\langle n_i, \text{true} \rangle$ onto the final node $n_{k+1}$. Similarly, let $$\psi_i : n_0 \xleftarrow{L} \langle n_i, \text{true} \rangle, i \in [0, k+1],$$

denote the backward projections from $\langle n_i, \text{true} \rangle$ onto node $n_0$.

Theorem 1 (Infeasibility-type theorem). The paths in $\Pi(n_0, \ldots, n_{k+1})$ are all semantically infeasible if either 1. $\phi_0 \wedge \phi_1 \wedge \ldots \wedge \phi_k \wedge \phi_{k-1} \equiv \text{false}$, or
2. $\psi_0 \wedge \psi_1 \wedge \ldots \wedge \psi_k \wedge \psi_{k+1} \equiv \text{false}$.

It is also possible to formulate other infeasibility-type theorems using state-set projection. Let $\eta_F$ be the forward fixpoint map computed starting from $\langle n_0, \phi_0 \rangle$. Let $$\varphi: n_0 \xrightarrow{L} \langle n_i, \gamma \cdot \eta_F(n_i) \rangle$$

be the state-set projection of the set $\gamma \circ \eta_F(n_i)$ from node $n_i$ onto node $n_0$.

Lemma 2. If $\phi_1 \wedge \ldots \wedge \phi_k \wedge \phi_{k+1} \equiv$ false then there is no semantically valid path from node $n_0$ to node $n_{k+1}$ that passes through all of $n_1, \ldots, n_k$. A similar result can be stated for a pair of nodes using the forward and the backward fixpoint maps. Let $\langle n, \phi \rangle$ be a property of interest, $\eta_F$ be the forward (post) fixpoint map computed starting from $\langle n_0, \phi_0 \rangle$ and $\eta_B$ be the backward (post) fixpoint map computed starting from $\langle n, \neg \phi \rangle$.

Lemma 3. Any error truce violating $\langle n, \phi \rangle$ cannot visit node n' if $\eta_F(n') \wedge \eta_B(n') \equiv$ false. Consider the example program shown in FIG. 1. We wish to prove the infeasibility of any path that simultaneously visits $n_0$, $n_2$ and $n_4$. To do so, we perform a backward projection of the states starting from $n_2$ and $n_4$ onto $n_0$. We assume that the projection is carried out using the interval abstract domain. The backward projection of $\langle n_2, \text{true} \rangle$ yields $\phi_2 : x \leq 0$. Similarly, the backward projection of $\langle n_4, \text{true} \rangle$ yields $\phi_4 : x > 0$. Since $\phi_2$ and $\phi_4$ are mutually contradictory, it is not possible for an execution of the CFG to visit the nodes $n_0$, $n_2$ and $n_4$. Similarly, the forward projection of $\langle n_0, \text{true} \rangle$ onto $n_4$ yields the assertion $\phi_0 : f > 0$. The forward projection of $\langle n_2, \text{true} \rangle$ onto $n_4$ yields the assertion $\phi_2$: false. Therefore, it is not possible for a semantically valid path to visit $n_0$, $n_2$ and $n_4$ simultaneously.

Infeasible-Path Enumeration: We have characterized semantically infeasible paths using state-set projections. These results may be applied to detect if $\Pi(n_0, \ldots, n_{k+1})$ is semantically infeasible for given set of nodes $n_0, \ldots, n_k$. We now consider the problem of enumerating such sets.

Let $N = \{n_0, n_1, \ldots, n_m\}$ denote the set of all nodes in the CFG. From the infeasibility results discussed previously, (e.g., Theorem. 1 and Lemma. 2), we note that each theorem computes a state-set projection $\psi_0, \ldots, \psi_m$, corresponding to the nodes $n_0, \ldots, n_m$ respectively. Furthermore, to test if paths traversing the subset $\{n_{i_1}, \ldots n_{i_k}\}$ are semantically infeasible, we check if the conjunction $\psi_{i_1} \wedge \ldots \wedge \psi_{i_k}$ is unsatisfiable.

Therefore, to enumerate all such subsets, we simply enumerate all index sets $I \subset \{1, \ldots, m\}$ such that $\wedge_{i \in I} \psi_i \equiv$ false. For each such set I, the corresponding subset of N characterizes the semantically invalid paths.

Definition 2 (Infeasible & Saturated Index Set). Given assertions $\phi_1, \ldots, \phi_m$, an index set $1 \subset \{1, \ldots, m\}$ is said to be infeasible iff $\wedge_{j \in I} \phi_j \equiv$ false. Likewise, an infeasible index set 1 is said to be saturated iff no proper subset is itself infeasible. Note that each infeasible set is an unsatisfiable core of the assertion $\phi_1 \wedge \ldots \wedge \phi_m$. Each saturated infeasible set is a minimal unsatisfiable core (with respect to set inclusion). Given assertions $\phi_1, \ldots \phi_m$, we seek to enumerate all saturated infeasible index sets. To solve this problem, we provide a generic method that uses a SAT solver to aid in the enumeration. We then specialize the generic enumeration technique to numerical abstract domains such as intervals, octagons, and polyhedra, to provide alternative enumeration techniques that can directly search in the space of unsatisfiability cores.

Generic Enumeration Technique: We assume an oracle O that checks the satisfiability of a conjunctive formula $\psi_I : \wedge_{l \in I} \psi_l$ corresponding to an index set $I \subset \{1, \ldots, m\}$. We may extract a minimal core index set $J \subseteq I$ by removing each element $i \in I$ and checking if $\psi_I$ becomes satisfiable when $\psi_i$ is removed. Alternatively, O may itself be able to provide a minimal core index set $J \subseteq I$.

Given O, the present procedure maintains a family of subsets $\mathfrak{I} \subset 2^{\{1, \ldots, m\}}$ that have not been checked for feasibility. Initially, we set $\mathfrak{I} = 2^{\{1, \ldots, m\}}$ consisting of all possible subsets. Each iteration includes two steps: 1) Pick an untested subset $J \in \mathfrak{I}$. 2) Check the satisfiability of $\psi_J : \wedge_{j \in J} \phi_j$. If $\psi_J$ is satisfiable, then remove J from the set $\mathfrak{I} : \mathfrak{I} = \mathfrak{I} - \{J\}$. If $\psi_J$ is unsatisfiable, let $I \subset J$ be the minimal core. We remove all supersets of J from $\mathfrak{I} : \mathfrak{I} = \mathfrak{I} - \{I | I \supset J\}$. Starting from $\mathfrak{I} \subset 2^{\{1, \ldots, m\}}$ we carry out steps (1) and (2) outlined above until $\mathfrak{I} = \emptyset$.

Symbolic enumeration using SAT: In practice, the set $\mathfrak{I}$ may be too large to maintain explicitly. It is therefore convenient to encode it succinctly in a SAT formula. We introduce Boolean selector variables $y_1, \ldots, y_m$ where $y_i$ denotes the presence of the assertion $\phi_i$ in the conjunct. The set $\mathfrak{I}$ is represented succinctly by a Boolean formula $\overline{\mathfrak{I}}$ over the selectors. The initial formula $\overline{\mathfrak{I}}_0$ is set to true. At each step, we may eliminate all supersets of a set J by adding the new clause $\vee_{j \in J} \neg y_j$.

As an optimization, we eliminate syntactically infeasible paths from consideration by encoding some information from the CFG. Nodes $n_i$ and $n_j$ conflict if there is no syntactic path starting from no that visits both $n_i$ and $n_j$. Let $C \subset N \times N$ denote the set of all conflicting node pairs. We exclude conflicting nodes or their supersets from the enumeration process by adding the clause $\neg y_i \vee \neg y_j$ for each conflict pair $(n_i, n_j) \in C$. This excludes sets having conflicting pairs from the enumeration.

Figure 4:
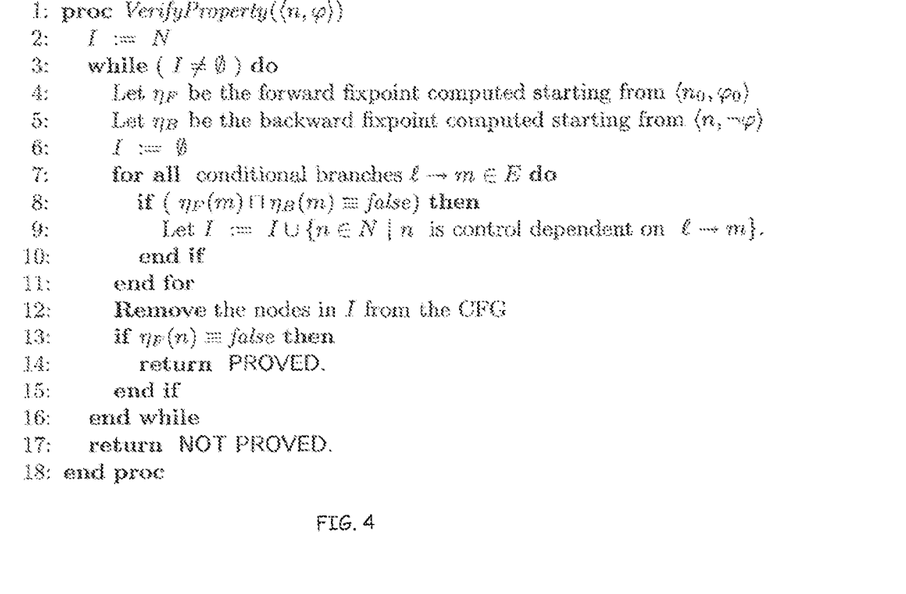
FIG. 4 is a diagram showing program code for SAT-based enumeration modulo theory to enumerate infeasible index sets in accordance with an illustrative embodiment.

FIG. 4 shows an illustrative procedure to enumerate all infeasible indices using SAT solvers and elimination of unsatisfiable cores. The generic path-enumeration technique enumerates all the infeasible index sets, corresponding to semantically infeasible paths. On the other hand, most infeasible sets seem to involve a small number of nodes. It is possible to adapt the technique described above to choose sets whose sizes are bounded. For infeasible paths involving at most two nodes, Lemma 3 may be employed to obtain a more powerful scheme based simply on computing a forward fixpoint map from no and a backward fixed point map from the target node n.

Graph-based enumeration using SAT. As shown, the procedure in FIG. 4 does not take into account the structure of the CFG. We may add syntactic conflict clauses to eliminate syntactically infeasible paths. However, it is possible to eliminate more subsets from consideration by using a graph-based enumeration scheme obtained by modifying the procedure in FIG. 4.

Example: Consider the CFG skeleton in FIG. 1, disregarding the actual operations in its nodes and edges. We suppose that all paths between nodes $n_0$ and $n_5$ are found to be infeasible: i.e., $\{0, 5\}$ is a saturated infeasible index set. Clearly, due to the structure of the CFG, there is no need to check the satisfiability of the index set $\{0, 3\}$, since all paths to node $n_5$ have to pass through node $n_3$. However, this information is not available to the SAT solver, which will generate the candidate index set $\{0, 3\}$, and the corresponding conjuncts will be checked by the theory solver.

A graph-based enumeration using SAT, that directly encodes the CFG structure as a part of the enumeration may be employed. This enumerates only those index sets that correspond to continuous syntactic paths in the CFG. Let $p_1, p_2, \ldots, p_m$ denote the indices of predecessors of a node $n_i (m \leq 1)$, and $s_1, s_2, \ldots, s_r$ denote the indices of successors of node a $n_i(r\leq 1)$. We encode the graph structure by adding the following constraints, corresponding to each node $n_i$ in the CFG:

Forward: If m>0, add $\neg y_i \vee \neg y_{p1} \vee \neg y_{p2} \vee \ldots \vee \neg y_{pm}$.
Backward: If n>0, $\neg y_i \vee \neg y_{s1} \vee \neg y_{s2} \vee \ldots \vee \neg y_{s11}$ In effect, we force index sets I such that whenever $n_i$ is included on a path (index set), at least one of its predecessor (and successor) nodes is also included. As before, we also add the conflict sets (C) on all pairs of nodes. The total size of these initial constraints is linear in the size of the CFG, (number of nodes, number of edges), although the SAT-based enumeration will of course consider all (possibly an exponential number of) syntactic paths. The graph-based enumeration procedure is similar to FIG. 4, where line 4 also adds graph-based constraints to $\overline{\mathfrak{I}}$.

Example: Again considering the CFG skeleton from FIG. 1, if the index set $\{0, 5\}$ were found to be in the unsatisfiable core of some infeasible index set, the additional clause $\neg y_0 \vee \neg y_5$ (line 12) will prevent any future consideration of index set $\{0, 3\}$. This is because when node $n_3$ is added to an index set, it will transitively imply addition of node $n_5$ in all cases (through the successor $n_4$, or as a direct successor). However, this would lead to a conflict in the SAT solver due to the blocking clause, thereby preventing enumeration of index set $\{0, 3\}$.

Utilizing MAX-SAT Techniques. In principle, a tighter integration of the propositional and the theory part is obtained by enumerating the minimal unsatisfiable (MUS) core of the SMT (Satisfiability Modulo Theories) formula: $\wedge_{i=0}^{m}(\neg y_i \vee \phi_i)$, along other propositional clauses over $y_1, \ldots, y_m$ arising from conflict pairs and syntactic graph-based constraints discussed earlier. Given a CNF formula f, the MAX-SAT problem seeks the maximal subset of clauses C in f, such that any strict extension to C is unsatisfiable. This is a variant on the common MAX-SAT problem that seeks the solution satisfying the maximum number of clauses (in terms of cardinality), and remains NP-hard. This problem is dual to that of finding the minimal unsatisfiable core. This duality can be exploited to use procedures for solving MAX-SAT for generating all minimal unsatisfiable cores. This could lead to faster methods since checking satisfiability seems to be considerably easier, in practice, than proving unsatisfiability.

A known two-phase algorithm for generating all minimal unsatisfiable cores of a Boolean formula can be employed. The first phases generate all maximal solutions by using an incremental SAT procedure within a sliding objective optimization loop. The second phase includes generating all minimal unsatisfiable cores from the set of (complements of) these maximal solutions. Such a procedure can be directly used in our setting by substituting an SMT solver during the first phase of the procedure.

Enumerating Unsatisfiable Cores Directly. In some domains, it may be possible to directly enumerate all the unsatisfiable cores of the conjunction $\phi_1 \wedge \phi_2 \wedge \ldots \wedge \phi_m$. If such an enumeration were possible, each unsatisfiable core directly yields the infeasible index set: I={i|A conjunct from $\phi_i$ is present in the unsat core}. The advantage of this enumeration method is that it avoids considering index sets for which the corresponding conjunctions may be theory satisfiable. Secondly, properties of the underlying abstract domain that yield $\phi_1, \ldots, \phi_m$ can be exploited for efficient enumeration.

We now consider such an enumeration inside the interval domain. The interval domain includes conjunctions of the form $x_i \in [l_i, u_i]$. Let $\phi_1, \ldots, \phi_m$ be the result of the state projections carried out using interval analysis. As a result, each $\phi_i$ is a concretization of an abstract element from the interval lattice. We assume that each $\phi_i$ is satisfiable. Let $\phi_i$ be the assertion $\wedge_j x_j \in [l_{ij}, u_{ij}]$, wherein each $l_{ij} \leq u_{ij}$. The following lemma shows that the lack of relational information in the interval domain restricts each unsatisfiable core to be of size at most 2.

Lemma 4. Any unsatisfiable core in $\wedge_i \phi_i$ involves exactly two conjuncts: $l_{ij} \leq x_j \leq u_{ij}$ in $\phi_i$ and $l_{kj} \leq x_j \leq u_{kj}$, such that $[l_{ij}, \leq u_{ij}] \cap [l_{kj}, \leq u_{kj}] = \emptyset$. As a result, it is more efficient to enumerate infeasible paths using domain-specific reasoning for the interval domain. Enumeration of unsatisfiable cores is possible in other domains also. For example, it may be achieved by finding all the negative cycles in the octagon domain, or enumerating dual polyhedral vertices in the polyhedral domain.

Path-Sensitive Analysis. Information about infeasible paths can be used to improve the accuracy of a path-insensitive analysis.

Figure 5:
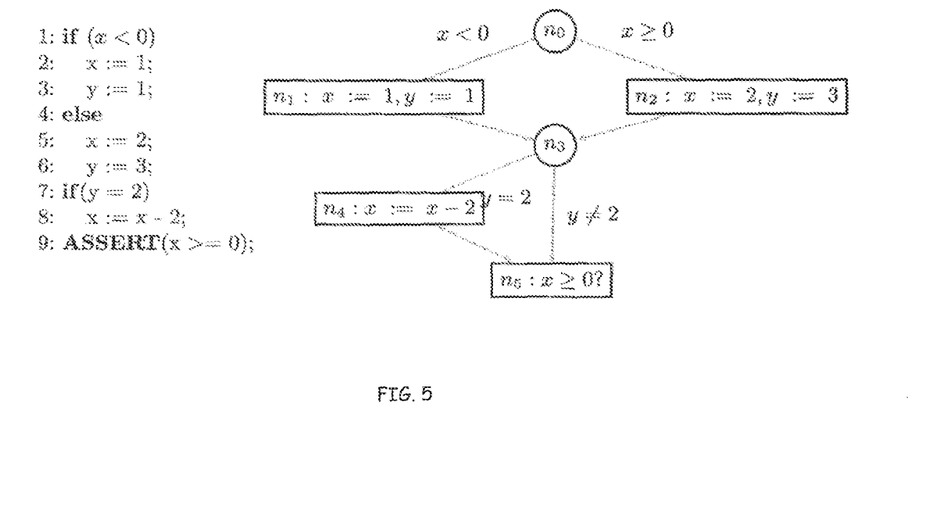
FIG. 5 is a diagram showing an example program and a control flow diagram for demonstrating principles in accordance with illustrative embodiments.

Example. Referring to FIG. 5, a program (left of FIG. 5) and its corresponding CFG (right of FIG. 5) are shown. The assertion at line 9 in the program is never violated. However, neither a forward propagation nor a backward propagation using the interval domain is able to prove the fact, as shown by the projections in Table. 1.

TABLE 1

Forward and backward projects over an interval domain for the program in FIG. 5.

| Forward Propagation | Backward Propagation |
|---|---|
| $n_0$: true | $n_5$: x < 0 |
| $n_1$: x < 0 | $n_4$: x < 2 |
| $n_2$: x ≥ 0 | $n_3$: x < 2 |
| $n_3$: $(1 \leq x \leq 2) \wedge (1 \leq y \leq 3)$ | $n_2$: true |
| $n_4$: $(-1 \leq x \leq 2) \wedge (y = 2)$ | $n_1$: true |
| $n_5$: $(-1 \leq x \leq 2) \wedge (1 \leq y \leq 3)$ | $n_0$: true |

Syntactic Language Refinement. Let $\Pi \langle N, E, \mu, n_0, \phi_0 \rangle$ be a CFG with a property $\langle n, \text{false} \rangle$ to be established. We may treat $\Pi$ as an automaton $\langle n, E \rangle$, wherein each node $n_i$ accepts the alphabet symbol. The resulting automaton represented by the CFG accepts all syntactically valid paths through the CFG starting from the node $n_0$. Let $L_\Pi$ denote the language of all node sequences accepted by CFG $\Pi$, represented as a deterministic finite automaton.

The results of the previous section allows us to infer sets I: $\{n_1, \ldots, n_k\} \subset N$ such that no semantically valid path from node $n_0$ to node $\overline{n}$ may pass through all the nodes of the set I. The refinement procedure carries out the following steps: 1. Enumerate infeasible node sets $I \subset N$ such that $\Pi(I \cup \{n_0, n\}) = 0$. 2. For each set I, remove all $\overline{\text{paths}}$ $\Pi(I \cup \{n_0, n\})$ from the syntactic language of the CFG:

$$L'_\Pi = L_\Pi - \frac{\{\pi | \pi \text{ is a path from } n_0 \text{ to passing through all the nodes in } I\}}{L_I}$$

Because the sets $L_\Pi$ and $L_I$ are regular, $L_{\Pi'}$ is also regular. On the other hand, in the presence of function calls in the CFG, the language $L_\Pi$ is context free. Nevertheless, the refinement procedure discussed in this part continues to hold even if $L_\Pi$ is context free. Let $\Pi'$ be the automaton recognizing $L_{\Pi'}$.

To begin with, it follows that $L_{\Pi'} \subset L_\Pi$. Secondly, consider an edge $e: \ell \rightarrow m \in \Pi'$. Let $n_i, n_j$ be the alphabets labeling the nodes $\ell$ and m, respectively. It follows that $e': n_i \rightarrow n_j$ is an edge in $\Pi$. The automaton $\Pi'$ is converted to a CFG as follows: 1. For each node $n' \in \Pi'$ labeled by the alphabet $n_i$, associate the same assignments in $n_i$ with $n'$. 2. For each edge $\ell \rightarrow m \in \Pi'$, associate the same condition as the corresponding edge $n_i \rightarrow n_j \in \Pi$.

As a result of the steps 1 and 2 above, we have obtained a refinement Π' of the CFG Π that is also a CFG. Moreover, all syntactically valid paths in Π' are also syntactically valid in Π. Therefore, Π' allows a smaller set of syntactically valid paths. As a result, the abstract interpretation on Π' may result in a more precise fixpoint for the nodes in the CFG.

The present scheme uses the infeasible CFG paths detected earlier as a partitioning heuristic. This is unique to the present methods.

Example: Returning to the example in FIG. 3, we find that the paths from $n_0 \rightarrow n_5$, traversing the nodes $I_0:\{n_1, n_4\}$ and $I_1:\{n_2, n_4\}$ are semantically infeasible. Therefore, we may remove such paths from the CFG using syntactic language refinement (SLR). The resulting CFG Π' is simply the original CFG with the node $n_4$ removed. A path-insensitive abstract interpreter over the CFG Π' suffices to prove the property. Thus, it is possible to use the information about infeasible paths detected to gain the effects of path sensitivity by using a path-insensitive analyzer after removing the infeasible paths from the syntactic language.

Application. In practice, the enumeration of all the infeasible sets of nodes is expensive. Therefore, consider a simple instantiation of the language refinement scheme that removes at most one intermediate node at each step, i.e, the sets I of intermediate nodes in the infeasible sets all have size at most 1 using Lemma 3 as the basis of our infeasible-path detection.

Figure 6:
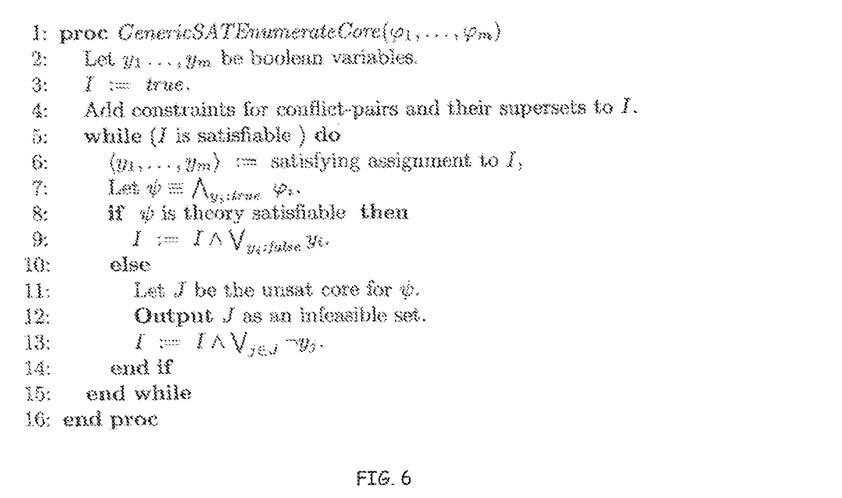
FIG. 6 is a diagram showing a program for using infeasible path detection to improve path-insensitive analysis in accordance with an illustrative embodiment.

Referring to FIG. 6, a resulting syntactic language refinement scheme is illustratively shown using infeasible path detection to improve path-insensitive analysis. Each step involves a forward fixpoint from the initial node and a backward fixpoint computed from the property node.

First, infeasible pairs of nodes are determined using Lemma 3, and the paths involving such pairs are pruned from the CFG. Using a forward analysis over the refined CFG, the subsequent iteration attempts to prove the property, and terminates if the property is proved. The iterative process of detecting infeasible properties and computing forward fixpoints is repeated until the property is verified, or no new nodes are detected as infeasible in consecutive iterations.

Example: Note that VerifyProperty proves the assertion in the example shown in FIG. 5. Referring again to FIG. 5, during the first iteration, the condition at line [8] in VerifyProperty holds for the edge $n_0 \rightarrow n_2$, Consequently, node $n_2$ will be removed before the next forward fixpoint computation. Hence, interval analysis will be able to determine that edge $n_3 \rightarrow n_4$ is infeasible, and therefore, the property $<n_5, x \geq 0>$ is verified.

Having described preferred embodiments of a system and method path-sensitive analysis through infeasible-path detection and syntactic language refinement (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for detecting infeasible paths in a program, comprising:
    performing a path-insensitive abstract interpretation to generate invariants that hold true in program locations;
    projecting said invariants along all paths to other program locations;
    enumerating a set of combinations of the projected invariants by generating subsets of the projected invariants that correspond to locations in continuous path segments in the program and checking the enumerated combinations to determine whether their conjunctions are logically false using a Boolean satisfiability solver and a theory-satisfiability solver in combination; and
    if an enumerated combination is checked and found to having a logically false conjunction, determining that an associated set of paths is infeasible.

2. The method as recited in claim 1, further comprising performing a syntactic language refinement to remove the infeasible paths from the program, resulting in a refined program for subsequent analysis.

3. The method as recited in claim 2, further comprising using a path-insensitive analysis on the refined program, after removal of infeasible paths, to obtain path sensitivity on the program.

4. The method as recited in claim 1, wherein proof of unsatisfiability from the theory-satisfiability solver is used to learn smaller subsets of assertions whose conjunction is logically false.

5. The method as recited in claim 1, further comprising storing the infeasible paths in a database.

6. The method as recited in claim 1, wherein infeasible path detection is performed during static analysis for proving program correctness.

7. A system for infeasible path detection, comprising:
    an abstract interpretation engine comprising a processor configured to perform a static analysis on a program for proving correctness, the abstract interpretation engine configured to perform a path-insensitive abstract interpretation to determine invariants corresponding to reachable program states at program locations and to project said invariants along program paths to other program locations; and
    a satisfiability solver and theory satisfiability solver configured to, in combination, enumerate and check satisfiability of combinations of projected invariants by generating conjunctions of subsets of projected invariants, wherein subsets of projected invariants that correspond to locations in continuous path segments in the program are checked to determine whether their conjunction is logically false, and where a conjunction being logically false determines that a corresponding set of program paths is infeasible.

8. The system as recited in claim 7, further comprising a database for storing the infeasible paths.

9. The system as recited in claim 7, wherein the satisfiability solver and theory satisfiability solver detects infeasible paths concurrently with the static analysis.

10. The system as recited in claim 7, wherein the satisfiability solver and theory satisfiability solver is further configured to perform a syntactic language refinement to remove the infeasible paths from the program, resulting in a refined program for subsequent analysis.

11. The system as recited in claim 10, wherein the satisfiability solver and theory satisfiability solver is further configured to use a path-insensitive analysis on the refined program, after removal of infeasible paths, to obtain path sensitivity on the program.

12. The system as recited in claim 7, wherein the satisfiability solver and theory satisfiability solver is further configured to use a proof of unsatisfiability to learn smaller subsets of projected invariants whose conjunction is logically false.

* * * * *